Oct. 6, 1942.   N. FRANK   2,297,951
DEICING DEVICE
Filed Aug. 31, 1939   2 Sheets-Sheet 1
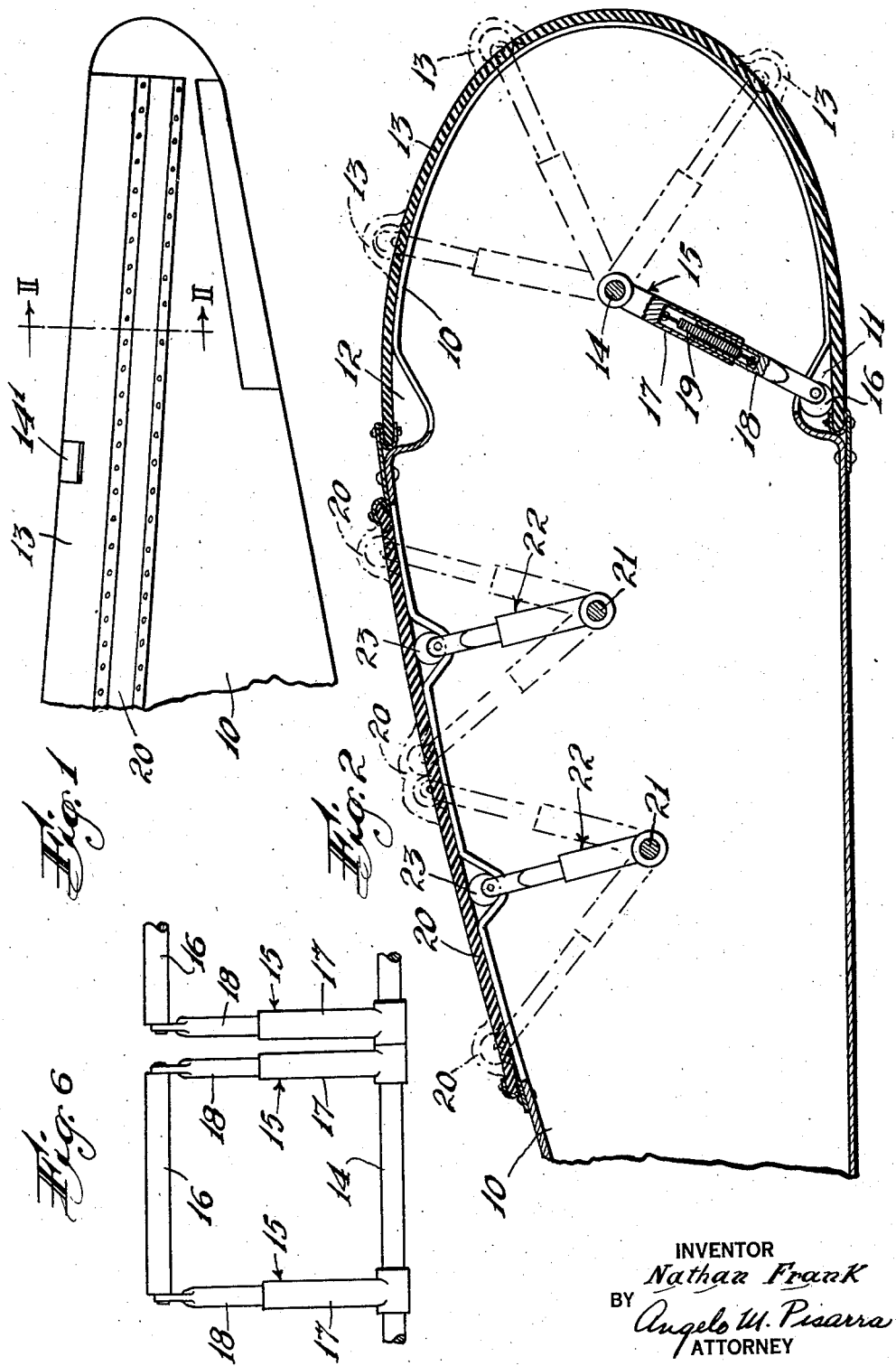
INVENTOR
*Nathan Frank*
BY
*Angelo M. Pisarra*
ATTORNEY Oct. 6, 1942.   N. FRANK   2,297,951
DEICING DEVICE
Filed Aug. 31, 1939   2 Sheets-Sheet 2
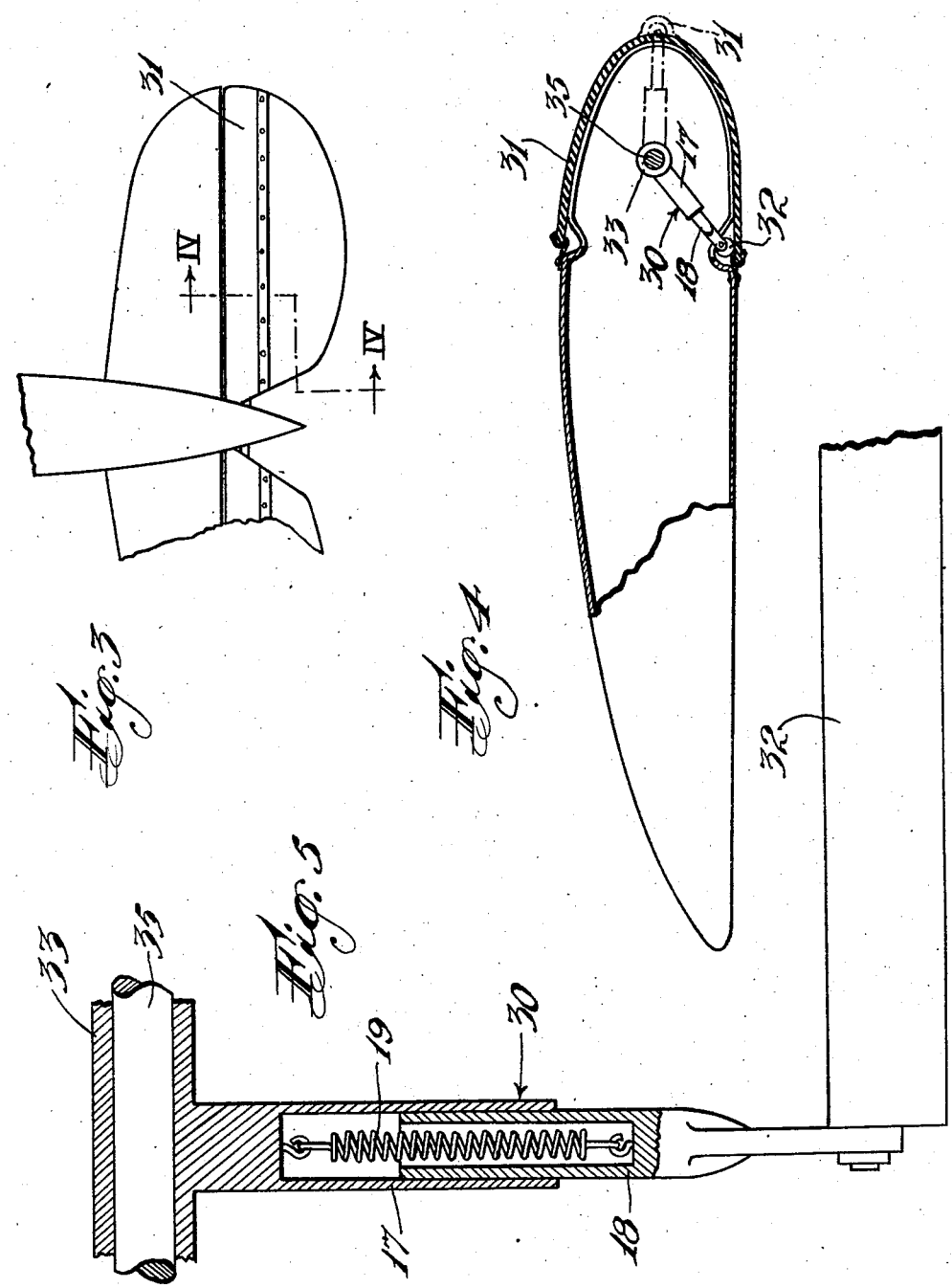
INVENTOR
*Nathan Frank*
BY *Angelo M. Pisarra*
ATTORNEY Patented Oct. 6, 1942

2,297,951

UNITED STATES PATENT OFFICE 2,297,951

DEICING DEVICE

Nathan Frank, Newark, N. J., assignor of twenty-four and one-half per cent to Louis J. Goldberg, Orange, and twenty-four and one-half per cent to Walter G. Winne, Hackensack, N. J.

Application August 31, 1939, Serial No. 292,832

6 Claims. (Cl. 244—134)

This invention relates to the art of de-icing and more particularly to the art of de-icing any part of a vehicle or transportation device on which the formation of ice may be very dangerous to the operator as well as to any passengers therein. The formation of ice and the accumulation thereof on certain parts of land vehicles, marine vehicles, and especially on the heavier-than-air, as well as on lighter-than-air craft, and more particularly airplanes, have been the cause of serious accidents, which have taken many lives.

While de-icers have heretofore been proposed for use on vehicles or transportation devices none of them has been completely satisfactory for one reason or another. In the course of my experimentations with devices of this character I have provided a novel and improved de-icer which is rugged, relatively inexpensive to manufacture and install either on vehicles or transportation devices now in use or as parts of newly produced vehicles or transportation devices in the course of manufacturing the same. In addition it is absolutely fool-proof in operation, requires no special skill to operate and is not dependent upon a large number of other units in a chain, one of which units might fail in a crisis. Moreover, the combination which I have provided by my invention is novel and has all of the above advantageous characteristics and in addition is particularly adapted for use in airplane construction where certainty of operation, lightness in weight and ease of checking are of major importance in that field.

The above advantages and objects of this invention, as well as other advantages and objects thereof, will be readily apparent from the following description and drawings wherein:

Figure 1 represents a fragmentary top plan view illustrating a portion of a wing of an airplane embodying my invention.

Figure 2 represents a cross-sectional view taken on line II of Figure 1 and showing my invention; the progressively different positions of the distorting device or cam, the distortion of the strip or cover member and the different positions of the lever actuators as the actuators are operated by the pilot.

Figure 3 is a fragmentary view illustrating a portion of an airplane and showing the horizontal stabilizer and the elevator embodying my invention.

Figure 4 is a cross-sectional view taken on line IV—IV of Figure 3 and showing an elevator embodying my invention.

Figure 5 is a view partly in section showing the cam actuators on a sleeve mounted on the elevator shaft and being actuable independently of the elevator shaft.

Figure 6 is a diagrammatic sketch showing the combination of the lever actuators, the operating shaft therefor, as well as the cams mounted on the actuators.

While this invention may be employed on any one of a number of different types of vehicles or transportation devices, and may be applied to any number of different parts of said vehicles or transportation devices, for the sake of brevity the invention has been illustrated and will be described merely as applied to certain parts of an airplane. As shown in the drawings there is illustrated a wing 10, which may be composed of metallic shell and which if desired may differ in contour from the ordinary wing of an airplane in that substantially the entire fore part thereof, which is to be protected from icing, may be slightly recessed along the entire length thereof. At the longitudinal ends of said slight recesses are shallow troughs extending the full length of said wing. Spaced along the recessed portion of said wing 10 are a plurality of narrow slots which extend from the groove or trough 11 on one side of the wing 10 to the groove or trough 12 on the other side of the wing 10. The distance between the slots is variable and may be of any desired magnitude. Located in said recess and extending from the longitudinal edges of said troughs or grooves 11 most remote from each other and along the entire length of said recess is a comparatively long strip 13 having an opening therein through which may project a lighting unit 14'. The longitudinal edges of the strip 13 are firmly and securely anchored to the wing body 10 by means of suitable anchoring devices, such as rivets or the like, to maintain the strip 13 in said recess and snugly against the surface of the wing 10.

The strip 13 may be composed of any desirable material, such as, flexible rubber, resilient fabric, or flexible metal. In fact it is preferable that the strip 13 be of waterproof and weatherproof material which may be flexed away from the wing body 10 by a flexing means and after the flexing means is removed from any portion thereof it will snap back or return to its original position to tightly hug the subjacent surface of the wing body 10.

Located within the main wing body 10 and extending along the length thereof and supported thereon by means of suitable journal bearings (not shown) is a shaft 14 adapted to be rotated in said journal bearings by any appropriate means having an actuator located in the pilot's cabin. Fixedly secured to said shaft 14 and extending therefrom are a plurality of pairs of actuating levers whose outer ends are preferably flat and extend through said slots located in the fore part of said wing. Between each pair of said levers 15 is pivotally mounted a roller 16. The rollers 16 are preferably offset or eccentrically mounted on said levers. The levers 15 preferably consist of a pair of telescoping members 17 and 18 connected to each other by means of a tensioning spring 19. In operation the rollers are located in trough 11, for example; when the pilot thinks that ice has been formed or may be forming on the resilient cover 13 he actuates the shaft in one direction whereupon the levers are swung around and cause the eccentrically mounted rollers 16 to roll and move along the recessed portion of the wing body 10 whereupon the resilient cover 13 is moved or cammed away from the wing body 10 to so distort the cover 13 that any ice which may have formed thereon, being inherently brittle, will crack and snap off of the cover 13.

As the rollers 16 move along the recessed surface of the wing body 10 to distort and move increments of cover 13 away from wing body 10 the next preceding increment of some size will snap back or return to its original position contiguous with the surface of the wing body 10 and finally the rollers 16 may be located at rest in the trough or well 12. The rollers may then be allowed to remain at rest in said trough 12 until the pilot again desires to de-ice, which he does by actuating the shaft in the opposite direction to move the roller towards and to the well 11. Of course, it is within the contemplation of this invention to provide a motor driven shaft 14 so that the levers may be oscillated back and forth and keep the cover 13 constantly in motion in a direction of its thickness. Because the levers consist of the telescoping members the shaft 14 need not be at the exact center of that portion of the arc of the wing which may be covered by the member 13. As a matter of fact, most often it is the case that the skirt 13 does not describe an arc of a true circle.

Another illustration of the application of this invention is to the upper part or substantially flat surface of wing 10. The upper surface of this wing may be covered with a wide strip or cover 20 composed of the same material as cover 13. Strip 20 is anchored to said wing along its longitudinal edges only with the bottom surface thereof being contiguous with the upper surface of the wing body 10. There may be one or, as shown, a plurality of shafts 21 extending along the length of said wing and within the same and supported by journals anchored therein. The shafts 21 are rotatably mounted on said journals and each shaft carries a plurality of pairs of levers 22, similar in all respects to levers 15, and also pivotally mounted to said levers 22 are rollers 23 which may be offset or eccentrically or concentrically rotatable thereon, depending upon the result desired.

The rolling surface of any and all of the rollers referred to herein may, if desired, be slightly knurled or roughened, or they may be composed of a frictional material, such as, soft rubber, in order to provide good traction between said rollers and the surface of the wing body 10 so that rotation of the rollers may take place in the course of swinging of the levers as the rollers move towards one trough or the other. Since the distance from the centers of the actuating shafts to the pivots of the rollers depends upon the swinging movement of the levers, the extensibility of the levers herein described normally forced towards each other by means of the resilient spring compensates for the change in distance between the center of the shaft and the pivotal point of the rollers at different positions of the rollers on the wing body 10. As shown in Figure 2, even though the cover is located on an almost flat surface of the wing body 10 the rollers may be actuated over a fairly long portion of the wing body 10 to actuate the cover by actuating the shafts 21. If desired the shafts 14 and 21 may be so interconnected by any suitable means that they are all actuated simultaneously.

Still another illustration of the wide applicability of this invention is to the elevators of an airplane. The fore portion of the elevator may be recessed and welled in very much the same way the fore portion of the wing 10 was recessed and welled and like the fore portion of the wing body 10 and the upper part of said wing 10 it may have a plurality of slots extending from trough to trough and accommodating the flattened ends of levers 30, similar in all respects except as to size as the aforedescribed levers 15.

A cover or strip 31 composed of the same material as the strip or cover 13 is located in said recess of said elevator and is secured thereto in the same manner in which strip 13 is secured to wing 10. The rollers 32 are pivotally mounted at the ends of levers 30 and are much smaller in diameter than the previously described rollers because of the small clearance between the elevator and the horizontal stabilizer. The shaft for operating said levers 30 and to which said levers 30 are rigidly secured is preferably a sleeve 33 mounted on, supported by and concentric with the normal or customary elevator operating shaft 35 which when actuated is adapted to actuate the elevator up or down. In this instance the elevator shaft 35 may be operated to actuate the elevator without affecting the shaft or sleeve 33.

When it is desired to de-ice the cover strip 31 the sleeve 33 is rotated in one direction to actuate the levers 30 which in turn actuate the rollers 32 to move and roll them along the fore surface of the elevator and thus distort cover strip 31 to snap and crack any ice which may have formed thereon, whereupon the ice drops therefrom.

It is within the purview of this invention to operate the shafts 14, 21 and sleeve 33 either simultaneously or independently of each other. When the sleeve 33 is operated the shaft 35 which operates the elevator is unaffected.

Although this invention has been described in some detail and especially as to its application to vehicles and transportation devices, it is to be understood that it is not to be limited thereby because the field of application is wide and varied and all herein is merely by way of illustration and is not to be regarded by way of limitation.

What is claimed is:

1. In an airplane, the combination with a wing thereof of a resilient means covering a portion of said wing, means for distorting said covering and adapted to be moved along the surface of that portion of said wing covered by said resilient means and between said surface and said resilient means to distort said resilient means and break ice which may have formed thereon and an arm pivoted on a fixed axis for actuating said second means along said surface, said pivoted arm connected to said second means, the length of said arm being automatically variable in the course of its arcuate movement in moving said second means along the covered surface of said wing.

2. In an airplane, the combination with a wing thereof of a resilient means covering a portion of said wing, said portion having an elongated opening therethrough, means for distorting said covering and adapted to be moved along the surface of that portion of the wing covered by said resilient means and between said surface and said resilient means to distort said resilient means and break ice which may have formed thereon, an arm pivoted on a fixed axis within said wing, extending through said slot and connected to said second means said arm comprising a plurality of elements adapted to be moved lengthwise with respect to each other, the length of said arm being automatically variable in the course of its arcuate movement in moving said second means along said surface.

3. In an airplane, the combination with a wing thereof of a resilient means covering a portion of said wing, said portion having an elongated slot therethrough, elongated means for distorting said covering and adapted to be moved along the surface of that portion of the wing covered by said resilient means and between said surface and said resilient means to distort said resilient means and break ice which may have formed thereon, said elongated means disposed transversely of said slot, an arm, one end of said arm pivoted at a fixed point within said wing and its other end pivotally connected to said elongated means, said arm extending through said slot and comprising a plurality of telescopic members adapted to be moved lengthwise with respect to each other automatically to vary the length of said arm in the course of its arcuate movement in moving said second means along said surface.

4. In an airplane, the combination with a wing thereof of a resilient means covering a portion of said wing, said portion having a plurality of elongated and narrow slots therethrough, a roller for distorting said covering and adapted to roll along on the surface of that portion of the wing covered by said resilient means and between said resilient means and said surface to distort said resilient means and break ice which may have formed thereon, a plurality of arms, one end of said arms pivoted on a fixed axis within said wing, said roller eccentrically and rotatably coupled to the other ends of said arms, said arms extending through said slots.

5. In an airplane, the combination with a wing thereof of a resilient means covering a portion of said wing, said portion having a plurality of elongated and narrow slots therethrough, a roller for distorting said covering and adapted to roll along on the surface of that portion of the wing covered by said resilient means and between said resilient means and said surface to distort said resilient means and break ice which may have formed thereon, a plurality of arms, one end of said arms pivoted on a fixed axis within said wing, said roller eccentrically and rotatably coupled to the other ends of said arms, said arms extending through said slots, each of said arms comprising a plurality of members adapted to be moved lengthwise automatically with respect to each other to vary the length of said arms in the course of its arcuate movement in moving said second means along on said surface.

6. In an airplane the combination with an elevator of resilient means covering a portion of the surface of said elevator and adapted to be distorted, a roller adapted to be moved along said surface and between said resilient means and said surface of said elevator to distort progressively different portions of said resilient means, a shaft for actuating said elevator and means for actuating said roller, said last mentioned means including a shaft concentric with said first shaft and said shafts adapted to be rotated independently of each other.

NATHAN FRANK.